United States Patent
Choi et al.

(10) Patent No.: US 12,541,136 B2
(45) Date of Patent: Feb. 3, 2026

(54) LENS DRIVING DEVICE AND CAMERA MODULE INCLUDING THE SAME

(71) Applicant: Samsung Electro-Mechanics Co., Ltd., Suwon-si (KR)

(72) Inventors: Yunkyoung Choi, Suwon-si (KR); Hae-Seung Hyun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 275 days.

(21) Appl. No.: 18/350,492

(22) Filed: Jul. 11, 2023

(65) Prior Publication Data

US 2025/0020973 A1    Jan. 16, 2025

(30) Foreign Application Priority Data

Dec. 29, 2022   (KR) .................. 10-2022-0188541

(51) Int. Cl.
*G03B 5/00* (2021.01)
*G02B 27/64* (2006.01)
*G03B 13/36* (2021.01)

(52) U.S. Cl.
CPC ............ *G03B 5/00* (2013.01); *G02B 27/646* (2013.01); *G03B 13/36* (2013.01); *G03B 2205/0076* (2013.01)

(58) Field of Classification Search
CPC ............ G03B 5/00; G03B 2205/0076; G03B 2205/0023; G03B 2205/0007; G02B 27/646; H04N 23/68

See application file for complete search history.

(56) References Cited

U.S. PATENT DOCUMENTS

| | | | |
|---|---|---|---|
| 2011/0063741 A1* | 3/2011 | Park | G02B 7/022 359/823 |
| 2013/0002933 A1 | 1/2013 | Topliss et al. | |
| 2013/0162896 A1* | 6/2013 | Kang | G03B 5/00 348/E5.026 |
| 2019/0302396 A1* | 10/2019 | Zhu | F03G 7/065 |
| 2022/0345021 A1 | 10/2022 | Duan et al. | |

(Continued)

FOREIGN PATENT DOCUMENTS

| | | |
|---|---|---|
| CN | 211236406 U | 8/2020 |
| CN | 113438398 A | 9/2021 |

(Continued)

OTHER PUBLICATIONS

Korean Office Action issued on Feb. 17, 2025, in corresponding Korean Patent Application No. 10-2022-0188541. (6 pages in English, 6 pages in Korean).

(Continued)

*Primary Examiner* — Christopher E Mahoney
(74) *Attorney, Agent, or Firm* — NSIP Law (57) ABSTRACT

Disclosed is a lens driving device including a lens holder configured to accommodate a lens barrel, a support frame disposed below the lens holder in an optical axis direction, OIS driving members configured to provide tension and each including one end fixed to an upper end of the lens holder, and the other end fixed to the support frame, and an elastic member interposed between a lower surface of the lens holder and an upper surface of the support frame and configured to provide an elastic force.

17 Claims, 10 Drawing Sheets

(56) References Cited

U.S. PATENT DOCUMENTS

2023/0004065 A1\* 1/2023 Osada .................... G03B 30/00
2023/0213728 A1 7/2023 Brown et al.

FOREIGN PATENT DOCUMENTS

| | | | | |
|---|---|---|---|---|
| CN | 114710606 A | \* | 7/2022 | ............. H04N 23/55 |
| EP | 4 030 600 A1 | | 7/2022 | |
| JP | 2013-195512 A | | 9/2013 | |
| KR | 10-1770856 B1 | | 9/2017 | |
| KR | 10-2018-0009467 A | | 1/2018 | |
| WO | WO 2022/029441 A1 | | 2/2022 | |

OTHER PUBLICATIONS

Korean Office Action Issued on Oct. 17, 2025, in Counterpart Korean Patent Application No. 10-2022-0188541 (2 Pages in English, 2 Pages in Korean).

\* cited by examiner

LENS DRIVING DEVICE AND CAMERA MODULE INCLUDING THE SAME

CROSS-REFERENCE TO RELATED APPLICATIONS

This application claims the benefit under 35 USC 119 (a) of Korean Patent Application No. 10-2022-0188541 filed in the Korean Intellectual Property Office on Dec. 29, 2022, the entire disclosure of which is incorporated herein by reference for all purposes.

BACKGROUND

1. Field

The present disclosure relates to a lens driving device and a camera module including the same.

2. Description of the Background

The use of electronic devices may be a result of development of information communication technologies and semiconductor technologies. These electronic devices may converge various functions and provide the converged functions without remaining in a traditional inherent region.

Cameras may be applied to portable electronic devices such as tablet PCs and laptop computers as well as smartphones. The camera of the portable electronic device may adopt an autofocus (AF) function, an optical image stabilizer (OIS) function, and a zoom function.

The autofocus function may refer to a function capable of acquiring a clear image on an image formation plane of an image sensor by moving a lens, which is positioned forward of the image sensor, in an optical axis direction in accordance with a distance from the subject.

The optical image stabilizer function may include both camera-swaying correction or hand-shaking correction and prevent an image of a subject to be captured from vibrating because of a photographer's inadvertent camera-swaying or hand-shaking in a state in which the camera is being moved or fixed.

In terms of the development of one-person media, a function of shooting videos by using a mobile camera may be considered. Therefore, the optical image stabilizer function capable of softly controlling not only stationary images but also videos may be further desired.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens driving device includes a lens holder configured to accommodate a lens barrel, a support frame positioned below the lens holder in an optical axis direction, OIS driving members configured to provide tension and each including one end fixed to an upper end of the lens holder, and the other end fixed to the support frame, and an elastic member interposed between a lower surface of the lens holder and an upper surface of the support frame and configured to provide an elastic force.

The elastic member may be fixed to one or more of a center of a lower surface of the lens holder and a center of an upper surface of the support frame.

The elastic member may have a cylindrical shape.

The elastic member may provide an elastic force to the lens holder and the support frame in the optical axis direction.

A first elastic member guide may be positioned on the lens holder and protrude from a lower surface of the lens holder along an edge of a region that comes into contact with an upper end of the elastic member.

A second elastic member guide may be positioned on the support frame and protrude from an upper surface of the support frame along an edge of a region that comes into contact with a lower end of the elastic member.

The OIS driving members may include a plurality of shape memory alloy wires.

The lens driving device may include four edge portions positioned at an upper end of the lens holder, and four corner portions positioned on the support frame and corresponding to the four edge portions of the lens holder in the optical axis direction, in which one end of each of the OIS driving members is fixed to one of the four edge portions, and the other end of each of the OIS driving members is fixed to one of the corner portions of the support frame corresponding, in the optical axis direction, to another edge portion adjacent to the edge portion to which the one end of each of the OIS driving members is fixed.

Upper-end fixing portions to which ends of the OIS driving members are fixed may be positioned on the lens holder, and the upper-end fixing portions may be positioned on at least two edge portions that are opposite to each other in a diagonal direction among the four edge portions.

Lower-end fixing portions to which the other ends of the OIS driving members are fixed may be positioned on the support frame, and the lower-end fixing portions may be positioned on at least two corner portions that are opposite to each other in the diagonal direction among the four corner portions.

Upper-end fixing portions to which ends of the OIS driving members are fixed may be positioned on the lens holder, and the upper-end fixing portions may be respectively positioned on the four edge portions.

Lower-end fixing portions to which the other ends of the OIS driving members are fixed may be positioned on the support frame, and the lower-end fixing portions may be respectively positioned on the four corner portions.

One end of at least one OIS driving member may be fixed to each of the upper-end fixing portions.

In another general aspect, a camera module includes a housing, a lens barrel in which at least one lens is mounted, an AF driving part configured to move the lens barrel in an optical axis direction in the housing, a lens holder configured to accommodate the lens barrel, a support frame positioned below the lens holder in the optical axis direction, OIS driving members configured to provide tension and each including one end fixed to an upper end of the lens holder, and the other end fixed to the support frame, and an elastic member interposed between a lower surface of the lens holder and an upper surface of the support frame and configured to provide an elastic force.

The elastic member may be fixed to one or more of a center of a lower surface of the lens holder and a center of an upper surface of the support frame.

The OIS driving members may include a plurality of shape memory alloy wires.

The camera module may further include four edge portions positioned at an upper end of the lens holder, and four corner portions positioned on the support frame and corresponding to the four edge portions of the lens holder in the optical axis direction, in which one end of each of the OIS driving members is fixed to one of the four edge portions, and the other end of each of the OIS driving members is fixed to one of the corner portions of the support frame corresponding, in the optical axis direction, to another edge portion adjacent to the edge portion to which the one end of each of the OIS driving members is fixed.

In another general aspect, a lens driving device includes a support frame, an elastic member disposed on the support frame and configured to provide an elastic force, a lens holder configured to move on the elastic member, and configured to accommodate a lens barrel, and OIS driving wires configured to provide tension, wherein each OIS driving wire comprises one end fixed to an upper end of the lens holder, and the other end fixed to the support frame, and wherein the OIS driving wires are configured to move the lens holder on the elastic member relative to the support frame in one or more of an optical axis direction, a first direction perpendicular to the optical axis, a second direction perpendicular to the first direction and the optical axis direction, a tilt direction, and a rotation direction.

A camera module may include a housing, and the lens driving device disposed in the housing.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, the word "in a plan view" means when an object is viewed from above, and the word "in a cross-sectional view" means when a cross section made by vertically cutting an object is viewed from a lateral side.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly. Further, the constituent elements are defined as different names according to positions or functions thereof, but the constituent elements may be integrated.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

The described technology has been made in an effort to provide a lens driving device including an optical image stabilizer function capable of adjusting not only horizontal swaying but also three-dimensional swaying.

However, the object to be achieved by the embodiments is not limited to the above-mentioned object but may be variously expanded without departing from the technical spirit of the embodiments.

Figure 1:
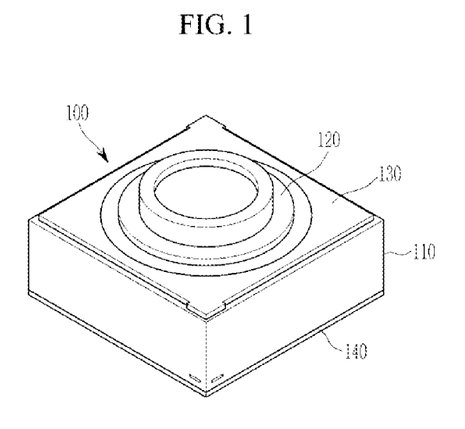
FIG. 1 is a perspective view illustrating an external appearance of a camera module according to one or more embodiments.

FIG. 1 is a perspective view illustrating an external appearance of a camera module according to one or more embodiments.

Referring to FIG. 1, a camera module 100 according to the present embodiment includes a housing 110, a lens barrel 120, a lens holder 130 configured to accommodate the lens barrel 120, and a support frame 140. The lens holder 130 and a lens driving device are accommodated in the housing 110.

The housing 110 may provide a space capable of accommodating the lens barrel 120 and the lens holder 130 and have a structure having an opened upper end.

The lens barrel 120 may have a hollow cylindrical shape so as to accommodate therein at least one lens used to capture an image of a subject. In case that the lens barrel 120 accommodates a plurality of lenses, the plurality of lenses may be mounted along an optical axis in the lens barrel 120. A required number of lenses are disposed in accordance with design of the lens barrel 120. The respective lenses may have the same or different optical characteristics such as refractive indexes.

The optical axis may be set as a central axis of the lens accommodated in the lens barrel 120. An optical axis direction means a direction parallel to the central axis. In the drawings, the optical axis is set as a z-axis, and an x-axis and a y-axis are preset as directions perpendicular to the optical axis. The x-axis and the y-axis are set to be perpendicular to each other.

The lens driving device refers to a device configured to move the lens barrel 120 and includes an auto focus (AF) driving part configured to adjust a focal point, and an optical image stabilizer (OIS) driving part configured to correct hand-shaking or swaying.

The AF driving part serves to move the lens barrel 120 in the optical axis direction. The AF driving part may adjust the focal point by moving the lens barrel 120 in the optical axis direction. For example, the AF driving part may include an AF driving wire including a shape memory alloy and move the lens barrel 120 in the optical axis direction by using a contractive force of the shape memory alloy that is generated by an increase in temperature caused by applied electric current. As another example, the AF driving part may include an AF driving magnet and an AF driving coil and move the lens barrel 120 in the optical axis direction by using interaction between the AF driving magnet and the AF driving coil. In the present disclosure, the AF driving part is not limited to a particular structure, and a detailed and specific description will be omitted.

The OIS driving part may prevent an image from being blurred or a video from swaying because of factors such as user's hand shaking during a process of capturing an image or shooting a video. That is, when swaying occurs because of the user's hand shaking or the like at the time of capturing an image, the OIS driving part compensates for swaying by applying a relative displacement, which corresponds to the swaying, to the lens barrel 120. The OIS driving part may correct the swaying by moving the lens barrel 120 in first and second directions (x-axis and y-axis directions) perpendicular to the optical axis direction or tilting the lens barrel 120 with respect to the optical axis direction (the z-axis direction).

Figure 2:
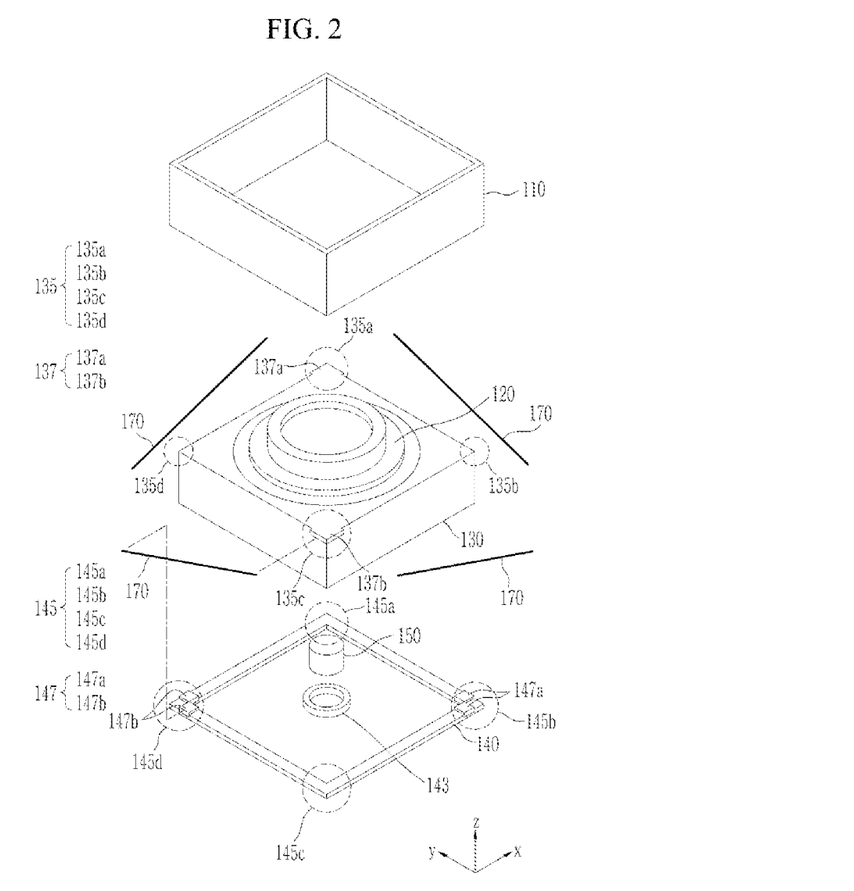
FIG. 2 is a perspective view illustrating a state in which an OIS driving part and a housing of the one or more embodiments of the camera module illustrated in FIG. 1 are disassembled according to an example.
Figure 3:
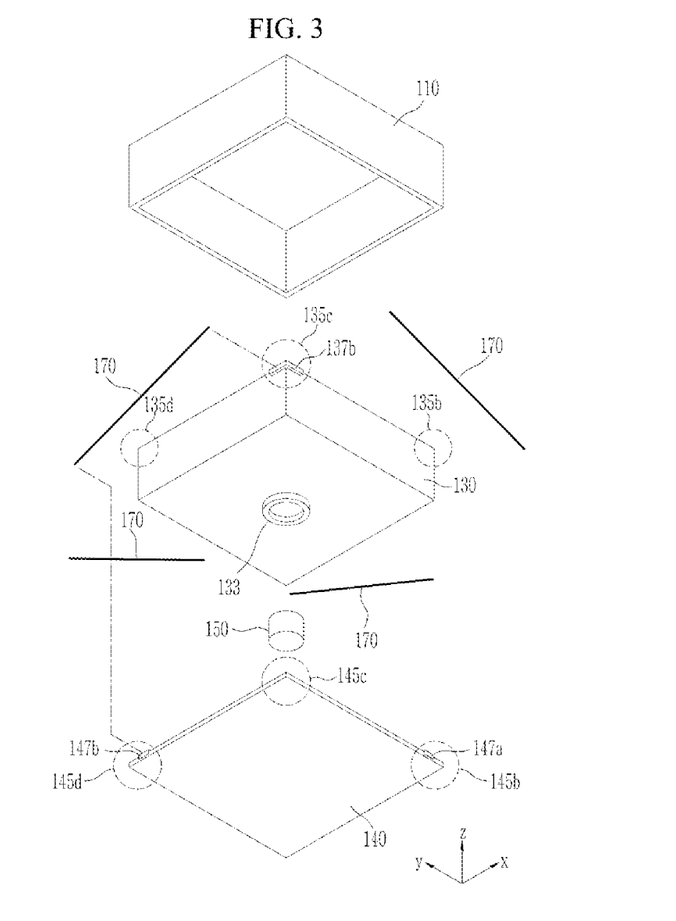
FIG. 3 is a bottom perspective view illustrating a state in which the OIS driving part and the housing of the one or more embodiments of the camera module illustrated in FIG. 1 are disassembled according to an example.
Figure 4:
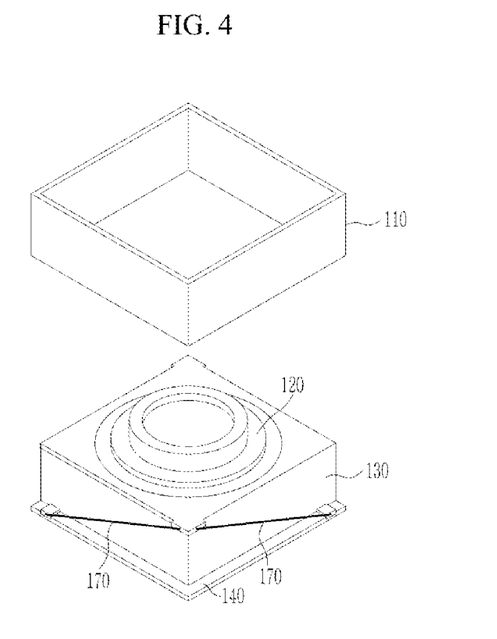
FIG. 4 is a perspective view illustrating a state in which the OIS driving part of the one or more embodiments of the camera module illustrated in FIG. 1 is coupled according to an example.

FIG. 2 is a perspective view illustrating a state in which an OIS driving part and a housing of the one or more embodiments of the camera module illustrated in FIG. 1 are disassembled according to an example, FIG. 3 is a bottom perspective view illustrating a state in which the OIS driving part and the housing of the one or more embodiments of the camera module illustrated in FIG. 1 are disassembled according to an example, and FIG. 4 is a perspective view illustrating a state in which the OIS driving part of the one or more embodiments of the camera module illustrated in FIG. 1 is coupled according to an example.

Referring to FIGS. 2 to 4, the OIS driving part may include the lens holder 130, the support frame 140, an elastic member 150, and OIS driving members 170.

The lens holder 130 and the support frame 140 are aligned in the optical axis direction and accommodated in the housing 110. The lens holder 130 and the support frame 140 serve to guide the movement of the lens barrel 120. The lens holder 130 has a center opening into which the lens barrel 120 may be inserted. The lens barrel 120 may be fixedly coupled to the lens holder 130 through the center opening. For example, the lens holder 130 may have a frame shape having four edges. The support frame 140 may also have four edges corresponding to the four edges of the lens holder 130.

The OIS driving members 170 may serve to move the lens holder 130 in the x-axis direction, the y-axis direction, and the z-axis direction and each include a shape memory alloy (SMA). The OIS driving members 170 may include a plurality of shape memory alloy wires. One end of the OIS driving member 170 may be fixed to an upper end of the lens holder 130, and the other end of the OIS driving member 170 may be fixed to the support frame 140, such that the OIS driving member 170 may provide tension.

Four edge portions 135 (135a, 135b, 135c, and 135d) may be positioned at the upper end of the lens holder 130. The four edge portions 135*a*, 135*b*, 135*c*, and 135*d* may define an approximately square shape when respective points are connected clockwise with respect to the optical axis.

Upper-end fixing portions 137 may be respectively positioned at two edge portions 135 that are opposite to each other in a diagonal direction among the four edge portions 135*a*, 135*b*, 135*c*, and 135*d*. That is, as illustrated in FIGS. 2 and 3, the upper-end fixing portions 137 may be respectively positioned at the two edge portions 135*a* and 135*c* that are opposite to each other in the diagonal direction. In this case, the remaining two edge portions 135*b* and 135*d* may not have the upper-end fixing portion 137.

The support frame 140 may have four corner portions 145 (145*a*, 145*b*, 145*c*, and 145*d*). The four corner portions 145*a*, 145*b*, 145*c*, and 145*d* may respectively correspond to the four edge portions 135*a*, 135*b*, 135*c*, and 135*d* of the lens holder 130. That is, each of the edge portions 135 of the lens holder 130 may correspond to each of the corner portions 145 of the support frame 140 that are aligned in the optical axis direction. For example, a first edge portion 135*a* may correspond to a first corner portion 145*a*, a second edge portion 135*b* may correspond to a second corner portion 145*b*, a third edge portion 135*c* may correspond to a third corner portion 145*c*, and a fourth edge portion 135*d* may correspond to a fourth corner portion 145*d*.

Lower-end fixing portions 147 may be disposed at two corner portions 145*b* and 145*d* that are opposite to each other in the diagonal direction among the four corner portions 145. In this case, the lower-end fixing portions 147 may be disposed at the two corner portions 145*b* and 145*d* that do not correspond to the edge portions 135*a* and 135*c* at which the upper-end fixing portions 137 are disposed. For example, as illustrated in FIG. 2, in case that the upper-end fixing portions 137 (137*a* and 137*b*) are disposed at the first edge portion 135*a* and the third edge portion 135*c*, the lower-end fixing portions 147 (147*a* and 147*b*) may be disposed at the second corner portion 145*b* and the fourth corner portion 145*d*.

One end of the OIS driving member 170 may be fixed to one of the four edge portions 135*a*, 135*b*, 135*c*, and 135*d* of the lens holder 130, and the other end of the OIS driving member 170 may be fixed to one of the four corner portions 145*a*, 145*b*, 145*c*, and 145*d* of the support frame 140. In this case, the corner portion 145 to which the OIS driving member 170 is fixed may correspond to another edge portion 135 adjacent to the edge portion 135 to which the other end of the OIS driving member 170 is fixed.

One end of the OIS driving member 170 may be fixed to the upper-end fixing portion 137, and the other end of the OIS driving member 170 may be fixed to the lower-end fixing portion 147. Ends of two OIS driving members 170 may be fixed to one upper-end fixing portion 137, and ends of two OIS driving members 170 may be fixed to one lower-end fixing portion 147. In this case, the upper-end fixing portions 137 may each have one fixing unit to which the two OIS driving members 170 are fixed or have two fixing units to which the two OIS driving members 170 are respectively fixed. The lower-end fixing portions 147 may each have one fixing unit to which the two OIS driving members 170 are fixed or have two fixing units to which the two OIS driving members 170 are respectively fixed. In the present embodiment, the example is described in which one fixing unit is disposed on the upper-end fixing portion 137. However, two fixing units may be disposed. In addition, in the present embodiment, the example is described in which two fixing units are disposed at the lower-end fixing portion 147. However, one fixing unit may be disposed. The above-mentioned cases all belong to the scope of the present disclosure.

The upper-end fixing portion 137 and the lower-end fixing portion 147, to which the two opposite ends of the OIS driving member 170 are fixed, may be respectively disposed at the edge portion 135 of the lens holder 130 and the corner portion 145 of the support frame 140 that do not correspond to each other. Therefore, in case that the lens holder 130 has a quadrangular frame shape, each of the OIS driving members 170 may be disposed in the diagonal direction along one side surface of the lens holder 130.

For example, referring to FIG. 2, the two OIS driving members 170 having the ends fixed to the second upper-end fixing portion 137*b* of the lens holder 130 may extend in the diagonal direction along different surfaces of the lens holder 130 and be respectively connected to the first lower-end fixing portion 147*a* and the second lower-end fixing portion 147*b* of the support frame 140.

The elastic member 150 is interposed between a lower surface of the lens holder 130 and an upper surface of the support frame 140. The elastic member 150 may be disposed between the lens holder 130 and the support frame 140 and provide an elastic force. The elastic force provided by the elastic member 150 may be applied in the optical axis direction or applied in the direction perpendicular to the optical axis.

In the present embodiment, the example is described in which the elastic member 150 has a cylindrical shape. However, the elastic member 150 may have various shapes including a triangular prismatic shape and a quadrangular column shape, and these shapes also belong to the present disclosure.

The elastic member 150 may be fixed to a center of a lower surface of the lens holder 130. A first elastic member guide 133 may be disposed at the center of the lower surface of the lens holder 130, and an upper end portion of the elastic member 150 may be fixed to the first elastic member guide 133. The first elastic member guide 133 may protrude from the lens holder 130 along an edge of a region that comes into contact with an upper end of the elastic member 150.

In addition, the elastic member 150 may be fixed to a center of an upper surface of the support frame 140. A second elastic member guide 143 may be disposed at the center of the upper surface of the support frame 140, and a lower end portion of the elastic member 150 may be fixed to the second elastic member guide 143. The second elastic member guide 143 may protrude from the support frame 140 along an edge of a region that comes into contact with a lower end of the elastic member 150.

Figure 5A:
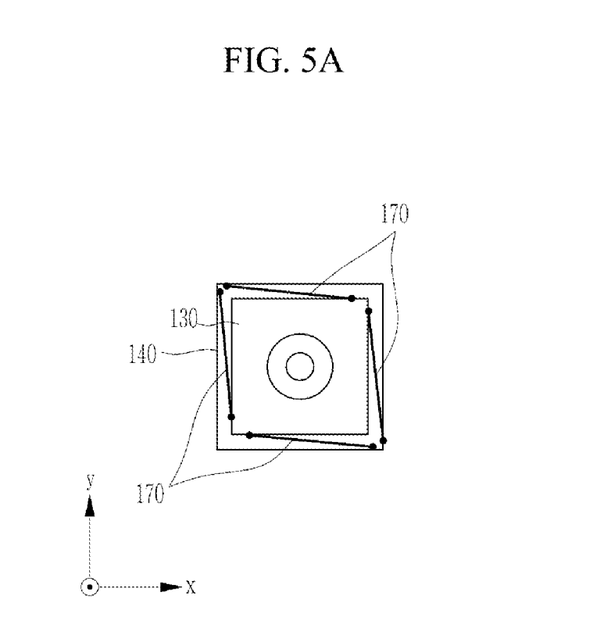
FIGS. 5A to 5D are views for explaining an operation of the OIS driving part in FIG. 4 according to an example.
Figure 5B:
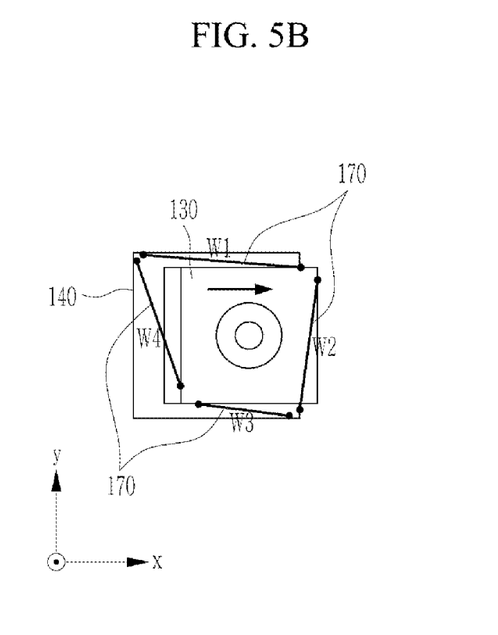
Figure 5C:
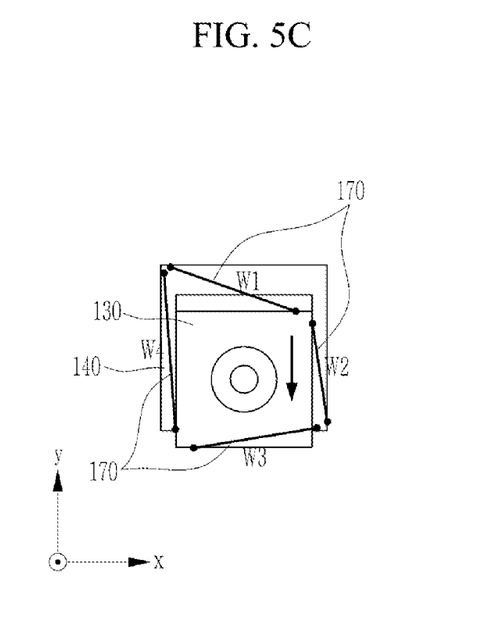
Figure 5D:
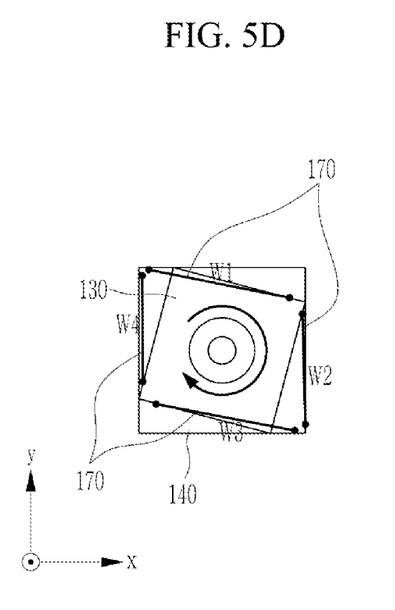
Figure 6:
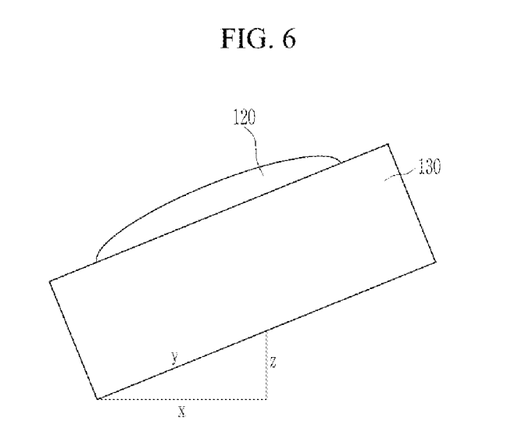
FIG. 6 is a view schematically illustrating the OIS driving part in FIG. 4 when viewed from the lateral side according to an example.

FIGS. 5A to 5D are views for explaining an operation of the OIS driving part in FIG. 4 according to an example, and FIG. 6 is a view schematically illustrating the OIS driving part in FIG. 4 when viewed from the lateral side according to an example.

Referring to FIGS. 5A to 5D, and 6, the OIS driving members 170 may apply driving power of the lens holder 130 by using contraction and extension of the shape memory alloys. When the electric current is applied to the OIS driving members 170, a driving displacement of the lens holder 130 may be controlled by the contractive forces of the shape memory alloys that are generated by an increase in temperature.

The OIS driving members 170 are kept in an extended state before the electric current is supplied. In an initial state illustrated in FIG. 5A, the lens holder 130 may be disposed at a middle portion of the upper surface of the support frame 140. When the electric current is supplied to the OIS driving members 170, the temperature is raised, and the OIS driving members 170 are contracted by the increase in temperature, such that a contractive traction force moves the lens holder 130. Thereafter, when a supply of electric current is cut off, the contractive traction force of the OIS driving members 170 is eliminated, and the elastic body 150 provides a restoring force, such that the lens holder 130 is restored to an initial position. In this case, when the contractive traction force is applied in the rectilinear direction perpendicular to the optical axis, the lens holder 130 may be moved away in the optical axis direction while being moved in the rectilinear direction from the initial state by the operation of the elastic member 150. The movement direction may vary depending on magnitudes of the contractive forces of the OIS driving members 170.

For example, in case that among the OIS driving members 170, a contractive force of W2 is low and a contractive force of W3 is high (W1 and W4 are extended), the lens holder 130 moves in the x-axis direction, such that a side at which W4 is positioned may move away from the support frame 140 in the optical axis direction (see FIG. 5B). In addition, in case that among the OIS driving members 170, the contractive force of W2 is high and a contractive force of W3 is low (W1 and W4 are extended), the lens holder 130 moves along the y-axis, such that a side at which W1 is positioned may move away from the support frame 14 in the optical axis direction (see FIG. 5C).

Referring to FIG. 6, when the lens holder 130 is tilted at a predetermined angle, the lens holder 130 may be spaced apart from the support frame 140 at a predetermined distance in the optical axis direction. In this case, the spacing distance may depend on conditions such as a thickness of the support frame 140 and a size of the lens holder 130.

In addition, in a state in which among the OIS driving members 170, W2 and W4 are contracted and W1 and W3 are extended, the lens holder 130 may be rotated clockwise. In a state in which W1 and W3 are contracted and W2 and W4 are extended, the lens holder 130 may be rotated counterclockwise (see FIG. 5D).

As described above, the lens driving device according to the present embodiment may perform the three-dimensional adjustment along the three axes, thereby correcting swaying generated in the direction perpendicular to the optical axis and also swaying generated in the optical axis direction.

Figure 7:
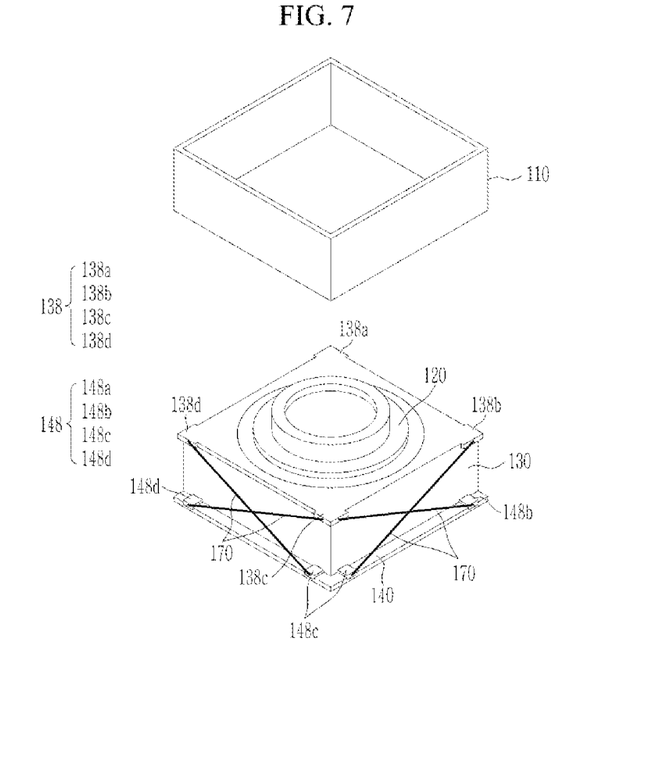
FIG. 7 is a perspective view illustrating a state in which an OIS driving part applied to a lens driving device of a camera module according to one or more other embodiments is disassembled.

FIG. 7 is a perspective view illustrating a state in which an OIS driving part applied to a lens driving device of a camera module according to one or more other embodiments is disassembled.

Referring to FIG. 7, the upper-end fixing portions 138 (138a, 138b, 138c, 138d) may be respectively disposed at the four edge portions 135a, 135b, 135c, and 135d of the lens holder 130 according to the present embodiment. In addition, the lower-end fixing portions 148 (148a, 148b, 148c, 148d) may be respectively disposed at the four corner portions 145a, 145b, 145c, and 145d of the support frame 140.

Ends of two OIS driving members 170 may be fixed to each of the upper-end fixing portions 138. In addition, other ends of two OIS driving members 170 may be fixed to each of the lower-end fixing portions 148. Therefore, the OIS driving members 170 may include the shape memory alloy wires, two of which are disposed to intersect each other along each of the lateral surfaces of the lens holder 130.

The edge portion 135 and the corner portion 145, to which two opposite ends of each of the OIS driving members 170 are fixed, may be connected to each other in a staggered manner. That is, one end of each of the OIS driving members 170 may be fixed to one of the four edge portions 135a, 135b, 135c, and 135d, and the other end of each of the OIS driving members 170 may be fixed to one of the corner portions 145 of the support frame 140 corresponding, in the optical axis direction, to another edge portion 135 adjacent to the edge portion 135 to which one end of each of the OIS driving members 170 is fixed. In other words, the two OIS driving members 170 fixed to the upper-end fixing portions 138 may extend in different directions and be fixed to different lower-end fixing portions 148. For example, referring to FIG. 7, the two OIS driving members 170 fixed to the third upper-end fixing portion 138c of the lens holder 130 may extend in different directions and be fixed to the second lower-end fixing portion 148b and the fourth lower-end fixing portion 148d.

According to the lens driving device and the camera module including the same according to the embodiment, it is possible to perform the three-dimensional adjustment along the three axes, thereby correcting not only swaying generated in a direction perpendicular to the optical axis and but also swaying generated in the optical axis direction.

However, the effects of the embodiments are not limited to the above-described effects, and it is apparent that they can be variously expanded without departing from the spirit and scope of the embodiments.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens driving device comprising:
   a lens holder configured to accommodate a lens barrel;
   a support frame disposed below the lens holder in an optical axis direction;
   OIS driving members configured to provide tension and each including one end fixed to an upper end of the lens holder, and the other end fixed to the support frame; and
   an elastic member interposed between a lower surface of the lens holder and an upper surface of the support frame and configured to provide an elastic force,
   wherein the elastic member is fixed to one or more of a center of a lower surface of the lens holder and a center of an upper surface of the support frame.

2. The lens driving device of claim 1, wherein:
   the elastic member has a cylindrical shape.

3. The lens driving device of claim 1, wherein:
   the elastic member provides an elastic force to the lens holder and the support frame in the optical axis direction.

4. The lens driving device of claim 1, wherein:

a first elastic member guide is disposed on the lens holder and protrudes from a lower surface of the lens holder along an edge of a region that comes into contact with an upper end of the elastic member.

5. The lens driving device of claim 1, wherein:

a second elastic member guide is disposed on the support frame and protrudes from an upper surface of the support frame along an edge of a region that comes into contact with a lower end of the elastic member.

6. The lens driving device of claim 1, wherein:

the OIS driving members comprise a plurality of shape memory alloy wires.

7. The lens driving device of claim 1, comprising:

four edge portions disposed at an upper end of the lens holder; and four corner portions disposed on the support frame and corresponding to the four edge portions of the lens holder in the optical axis direction, wherein one end of each of the OIS driving members is fixed to one of the four edge portions, and the other end of each of the OIS driving members is fixed to one of the corner portions of the support frame corresponding, in the optical axis direction, to another edge portion adjacent to the edge portion to which the one end of each of the OIS driving members is fixed.

8. The lens driving device of claim 7, wherein:

upper-end fixing portions to which ends of the OIS driving members are fixed are disposed on the lens holder, and the upper-end fixing portions are disposed on at least two edge portions that are opposite to each other in a diagonal direction among the four edge portions.

9. The lens driving device of claim 8, wherein:

lower-end fixing portions to which the other ends of the OIS driving members are fixed are disposed on the support frame, and the lower-end fixing portions are disposed on at least two corner portions that are opposite to each other in the diagonal direction among the four corner portions.

10. The lens driving device of claim 7, wherein:

upper-end fixing portions to which ends of the OIS driving members are fixed are disposed on the lens holder, and the upper-end fixing portions are respectively disposed on the four edge portions.

11. The lens driving device of claim 10, wherein:

lower-end fixing portions to which the other ends of the OIS driving members are fixed are disposed on the support frame, and the lower-end fixing portions are respectively disposed on the four corner portions.

12. The lens driving device of claim 10, wherein:

one end of at least one OIS driving member is fixed to each of the upper-end fixing portions.

13. A camera module comprising:

a housing;

a lens barrel in which at least one lens is mounted;

an AF driving part configured to move the lens barrel in an optical axis direction in the housing;

a lens holder configured to accommodate the lens barrel;

a support frame disposed below the lens holder in the optical axis direction;

OIS driving members configured to provide tension and each including one end fixed to an upper end of the lens holder, and the other end fixed to the support frame; and an elastic member interposed between a lower surface of the lens holder and an upper surface of the support frame and configured to provide an elastic force, wherein the elastic member is fixed to one or more of a center of a lower surface of the lens holder and a center of an upper surface of the support frame.

14. The camera module of claim 13, wherein:

the OIS driving members comprise a plurality of shape memory alloy wires.

15. The camera module of claim 13, further comprising:

four edge portions disposed at an upper end of the lens holder; and four corner portions disposed on the support frame and corresponding to the four edge portions of the lens holder in the optical axis direction, wherein one end of each of the OIS driving members is fixed to one of the four edge portions, and the other end of each of the OIS driving members is fixed to one of the corner portions of the support frame corresponding, in the optical axis direction, to another edge portion adjacent to the edge portion to which the one end of each of the OIS driving members is fixed.

16. A lens driving device comprising:

a support frame;

an elastic member disposed on the support frame and configured to provide an elastic force;

a lens holder configured to move on the elastic member, and configured to accommodate a lens barrel; and OIS driving wires configured to provide tension, wherein each OIS driving wire comprises one end fixed to an upper end of the lens holder, and the other end fixed to the support frame, wherein the OIS driving wires are configured to move the lens holder on the elastic member relative to the support frame in one or more of an optical axis direction, a first direction perpendicular to the optical axis, a second direction perpendicular to the first direction and the optical axis direction, a tilt direction, and a rotation direction, and wherein the elastic member is fixed to one or more of a center of a lower surface of the lens holder and a center of an upper surface of the support frame.

17. A camera module comprising:

a housing; and the lens driving device of claim 16 disposed in the housing.

* * * * *